US011119346B2

(12) United States Patent
Sun et al.

(10) Patent No.: US 11,119,346 B2
(45) Date of Patent: Sep. 14, 2021

(54) IPS TYPE DISPLAY PANEL AND DISPLAY DEVICE

(71) Applicant: SHENZHEN CHINA STAR OPTOELECTRONICS TECHNOLOGY CO., LTD., Guangdong (CN)

(72) Inventors: Lizhi Sun, Guangdong (CN); Xiangyang Xu, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 407 days.

(21) Appl. No.: 16/096,757

(22) PCT Filed: Aug. 31, 2018

(86) PCT No.: PCT/CN2018/103517
§ 371 (c)(1),
(2) Date: Oct. 26, 2018

(87) PCT Pub. No.: WO2019/218539
PCT Pub. Date: Nov. 21, 2019

(65) Prior Publication Data
US 2021/0088822 A1    Mar. 25, 2021

(30) Foreign Application Priority Data
May 16, 2018    (CN) .......................... 201810469594.9

(51) Int. Cl.
*G02F 1/1333*    (2006.01)
*G02F 1/1335*    (2006.01)
*G02F 1/1343*    (2006.01)

(52) U.S. Cl.
CPC .... *G02F 1/13338* (2013.01); *G02F 1/133514* (2013.01); *G02F 1/134363* (2013.01)

(58) Field of Classification Search
None
See application file for complete search history.

(56) References Cited

U.S. PATENT DOCUMENTS

| | | | | |
|---|---|---|---|---|
| 2012/0249436 A1* | 10/2012 | Choi | ..................... | G06F 3/0412 345/173 |
| 2013/0135540 A1* | 5/2013 | Nam | ................... | G02F 1/13338 349/12 |

(Continued)

FOREIGN PATENT DOCUMENTS

| | | |
|---|---|---|
| CN | 104020902 A | 9/2014 |
| CN | 104699305 A * | 6/2015 |

(Continued)

OTHER PUBLICATIONS

English translation of CN104699305A, Title: Touch display device, Author: Li Hongming; Qiu Yuwen; Zhong Dezhen; Zheng Huilong; Date of publication:Jun. 10, 2015 (Year: 2015).*

(Continued)

*Primary Examiner* — Shan Liu
(74) *Attorney, Agent, or Firm* — Leong C. Lei (57) ABSTRACT

An IPS display panel is disclosed. The panel includes an array substrate and a color filter substrate disposed in parallel and oppositely; and a liquid crystal layer disposed there between; wherein the array substrate includes a base substrate, a pixel electrode, an insulation layer, and a common electrode, the base substrate includes multiple data lines deposed in parallel and at intervals, the base substrate is disposed in parallel with and opposite to the color filter substrate, the pixel electrode is located at a surface of the base substrate facing the color filter substrate, the insulation layer covers a surface of the pixel electrode away from the (Continued)

base substrate, the common electrode is located on a surface of the insulation layer away from the pixel electrode; wherein the color filter substrate includes a first surface facing the array substrate, and providing with multiple touch receiving electrodes corresponding to the data lines.

17 Claims, 5 Drawing Sheets

(56) References Cited

U.S. PATENT DOCUMENTS

| | | | |
|---|---|---|---|
| 2016/0377898 A1* | 12/2016 | Xu | G06F 3/0443 349/12 |
| 2017/0115786 A1* | 4/2017 | Kimura | G06F 3/0412 |
| 2018/0067592 A1* | 3/2018 | Kimura | G06F 3/0445 |

FOREIGN PATENT DOCUMENTS

| | | |
|---|---|---|
| CN | 104699305 A | 6/2015 |
| CN | 104898318 A | 9/2015 |
| KR | 20120004232 A | 1/2012 |
| KR | 20120100648 A | 9/2012 |

OTHER PUBLICATIONS

International search report dated Dec. 10, 2018 from corresponding application No. PCT/CN2018/103517.

* cited by examiner

IPS TYPE DISPLAY PANEL AND DISPLAY DEVICE

CROSS-REFERENCE TO RELATED APPLICATION

This application is a National Phase of International Application Number PCT/CN2018/103517, filed Aug. 31, 2018, and claims the priority of Chinese Patent Application No. 2018104695949, entitled "IPS TYPE DISPLAY PANEL AND DISPLAY DEVICE", filed on May 16, 2018, the disclosure of which is incorporated herein by reference in its entirety.

FIELD OF THE INVENTION

The present invention relates to the field of display technologies, and in particular to an in-plane switching type display panel and a display device.

BACKGROUND OF THE INVENTION

The LCD (Liquid Crystal Display) has become the mainstream display technology on the market with its advantages of high brightness, long life, wide viewing angle, and large size display. For Thin-Film Transistor Liquid Crystal Display (TFT-LCD), the driving mode of the liquid crystal can be classified into three types of TN (Twisted Nematic) or Super Twisted Nematic (STN) type, In-Plane Switching (IPS) and Vertical Alignment (VA). The IPS mode is a mode in which liquid crystal molecules are driven to rotate in the plane of the substrate in response to an electric field substantially parallel to the substrate surface, and has been widely concerned and applied due to excellent viewing angle characteristics and pressing characteristics.

Unlike the conventional TN (Twisted Nematic) type liquid crystal display, the two electrodes are respectively on the upper and lower substrates, and the pixel electrodes and the common electrode which control the rotation of the liquid crystal molecules in the IPS display are fabricated on the same substrate. The liquid crystal molecules are arranged perpendicular to the substrate under the action of an electric field. However, the liquid crystal molecules above the data lines of the array substrate are also affected by the electric field, and the arrangement thereof is irregular, which may cause dark light leakage and poor display.

SUMMARY OF THE INVENTION

An object of the present invention to provide an in-plane switching type display panel for improving the phenomenon that liquid crystal molecules above the data lines in the array substrate are deflected by the electric field between the pixel electrodes and the common electrodes, thereby ensuring a normal display of the display image.

The present invention also provides a display device.

The In-Plane Switching (IPS) type display panel of the present invention, comprising: an array substrate and a color filter substrate which are disposed in parallel and oppositely; and a liquid crystal layer disposed between the array substrate and the color filter substrate; wherein the array substrate includes a base substrate, a pixel electrode, an insulation layer, and a common electrode, the base substrate includes multiple data lines deposed in parallel and at intervals, the base substrate is disposed in parallel with and opposite to the color filter substrate, the pixel electrode is located at a surface of the base substrate facing the color filter substrate, the insulation layer covers a surface of the pixel electrode away from the base substrate, the common electrode is located on a surface of the insulation layer away from the pixel electrode; wherein the color filter substrate includes a first surface facing the array substrate, and the first surface is provided with multiple touch receiving electrodes corresponding to the data lines.

Wherein the multiple data lines extend along a first direction on the base substrate, and the multiple touch receiving electrodes extend along the first direction on the first surface, in the direction perpendicular to the base substrate, the touch receiving electrode is directly opposite to the data line.

Wherein the base substrate includes multiple scanning lines which are disposed in parallel and at intervals, the multiple scanning lines extend along a second direction on the base substrate, the second direction is perpendicular to the first direction, the multiple scanning lines and the multiple data lines are insulated from each other and intersected.

Wherein in a direction perpendicular to the base substrate, the first surface is provided with multiple touch transmitting electrode facing the scanning line, and the multiple touch transmitting electrodes extend along the second direction on the first surface, and the touch transmitting electrode is intersected with the touch receiving electrode.

Wherein the touch transmitting electrode includes a first segment and a second segment disposed oppositely, the first segment includes a first side facing the second segment, and the second segment includes a second side opposite to the first side; the touch receiving electrode includes a third segment and a fourth segment disposed oppositely, and the third segment includes a third side facing the fourth segment, and the fourth segment includes a fourth side disposed opposite to the third side; the first side, the second side, the third side, and the fourth side are enclosed to form a closed hollow region.

Wherein in a direction perpendicular to the base substrate, the first surface is provided with multiple first sub-black matrixes directly opposite to the scanning line, the first sub-black matrix extends along the second direction on the first surface, and the first sub-black matrix is intersected with the touch receiving electrode.

Wherein in a direction perpendicular to the base substrate, the first surface is provided with multiple second sub-black matrixes directly opposite to the scanning line, and the second sub-black matrix extends along the second direction on the first surface, the second sub-black matrix is disposed to be intersected with the touch receiving electrode, and the touch transmitting electrode is located at a surface of the second sub-black matrix away from the color filter substrate.

Wherein in a direction perpendicular to the base substrate, the first a surface is provided with multiple third sub-black matrixes directly opposite to the data line, and the multiple third sub-black matrixes extend along the first direction on the first surface, the touch receiving electrode is located on a surface of the third sub-black matrix away from the color filter substrate.

Wherein the base substrate includes a substrate, a gate electrode, a functional layer and a source-drain electrode, the substrate is disposed in parallel with and opposite to the color filter substrate, and the gate electrode, the functional layer and the source-drain electrode are sequentially stacked on the surface of the substrate facing the surface of the color filter substrate, the multiple scanning lines and the gate electrode are located in the same layer, and the multiple data lines and the source-drain electrode are located in the same layer.

The in-plane switching type display panel of the present invention designs a touch receiving electrode corresponding to the data line on the color film substrate, and forms a shielding electric field between the pixel electrode and/or the common electrode, so that the liquid crystal molecules above the data line are not disturbed by the electric field between the pixel electrode and the common electrode, and the display image of the in-plane switching type display panel is not affected.

BRIEF DESCRIPTION OF THE DRAWINGS

In order to more clearly illustrate the embodiments of the present invention or the technical solutions in the prior art, the drawings used in the embodiments or the prior art description will be briefly introduced below. Obviously, the drawings in the following description are only some embodiments of the present invention. For those of ordinary skill in the art, without creative labor, other drawings can also be obtained from these figures.

DETAILED DESCRIPTION OF PREFERRED EMBODIMENTS

The technical solutions in the embodiments of the present invention are clearly and completely described in the following with reference to the accompanying drawings in the embodiments of the present invention. Obviously, the described embodiments are only a part of the embodiments of the present invention, and not all of the embodiments. All other embodiments obtained by those skilled in the art based on the embodiments of the present invention without creative efforts are within the scope of the present invention.

The present invention provides a display device including a controller and an in-plane switching type display panel (hereinafter referred to as an IPS type display panel). The display device may be a small-sized mobile phone, a large-sized notebook computer, a tablet computer, a monitor, or an LCD TV. The controller may be a computer device or a remote controller or the like that can control the IPS type display panel to be turned on or off. Wherein, the IPS type display panel is characterized in that the uniformly aligned liquid crystal molecules are located in a plane parallel to the glass substrate, the pixel electrode and the common electrode are designed on the same side, and after the voltage is applied between the pixel electrode and the common electrode, a planar electric field is formed between the pixel electrode and the common electrodes to cause the liquid crystal molecules to rotate in the plane, causing birefringence to control the amount of light transmitted.

Figure 1:
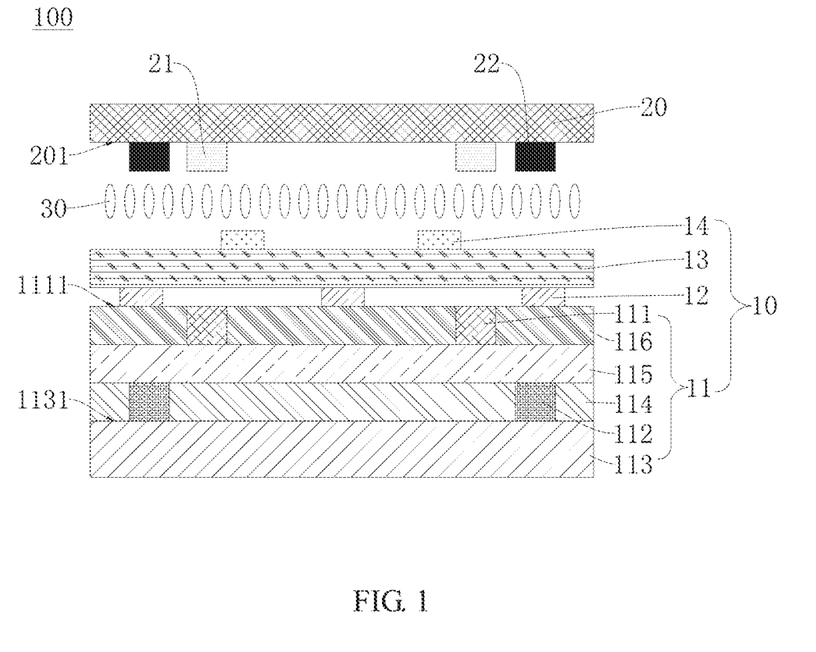
FIG. 1 is a schematic structural view of an embodiment of a display panel according to the present invention.

Referring to FIG. 1, the present invention provides an IPS type display panel 100. The IPS display panel 100 includes an array substrate 10 and a color filter substrate 20 which are disposed in parallel and oppositely and a liquid crystal layer 30 disposed between the array substrate 10 and the color filter substrate 20. The array substrate 10 includes a base substrate 11, a pixel electrode 12, an insulation layer 13, and a common electrode 14.

The base substrate 11 includes multiple data lines 111 deposed in parallel and at intervals. The base substrate 11 is disposed in parallel with and opposite to the color filter substrate 20, and the pixel electrode 12 is located at a surface 1111 of the base substrate 11 facing the color filter substrate 20, the insulation layer 13 covers a surface of the pixel electrode 12 away from the base substrate 11, and the common electrode 14 is located on a surface of the insulation layer 13 away from the pixel electrode 12. The color filter substrate 20 includes a first surface 201 facing the array substrate 10, and the first surface 201 is provided with multiple touch receiving electrodes 21 corresponding to the data lines 111.

Wherein, the multiple data lines 111 extend along a first direction on the base substrate 11, and the multiple touch receiving electrodes 21 extend along the first direction on the first surface 201. In the direction perpendicular to the base substrate 11, the touch receiving electrode 21 is directly opposite to the data line 111. In this embodiment, the first direction is a vertical direction. The touch receiving electrode 21 is opposite to the data line 111, that is, the touch receiving electrode 21 is similar to the data line 111 in shape, and the touch receiving electrode 21 is located directly above the data line 111. The touch receiving electrode 21, the pixel electrode 12, and the common electrode 14 are all made of indium tin oxide (ITO).

When the IPS type display panel 100 of the present invention enters the display mode, the pixel electrode 12 and the common electrode 14 respectively apply with an electric signal, and an electric field generated between the pixel electrode 12 and the common electrode 14 causes the liquid crystal molecules in the liquid crystal layer 30 to rotate, and at the same time, the touch receiving electrodes 21 on the first surface 201 is also applied with an electrical signal such that among the touch receiving electrodes 21 and the pixel electrodes 12 and the common electrode 14, a shielding electric field is formed, so that the liquid crystals located above the data lines 111 are not deflected and arranged in a disorderly manner, which ensures a normal display of the IPS type display panel 100.

Figure 2:
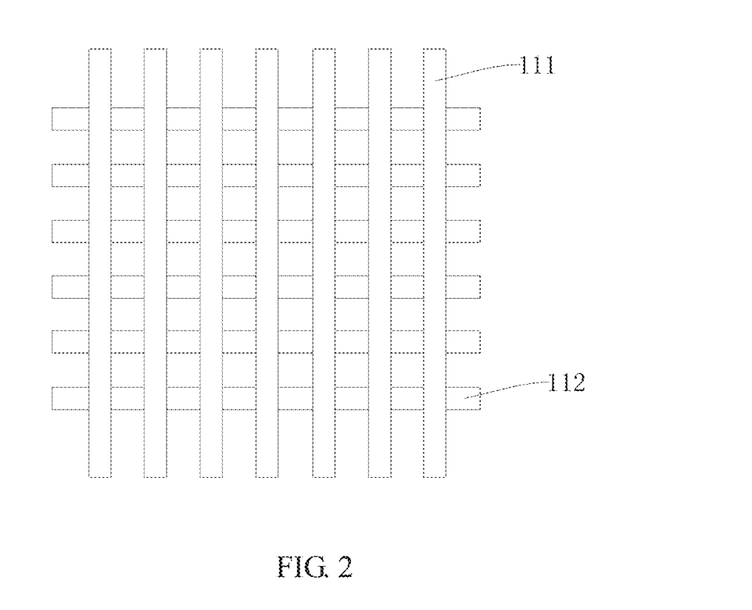
FIG. 2 is a schematic plan view of the structure of a data line and a scanning line in the display panel of FIG. 1.

Referring to FIG. 2 together, the base substrate 11 includes multiple scanning lines 112 which are disposed in parallel and at intervals, and the multiple scanning lines 112 extend along a second direction on the base substrate 11, wherein the second direction is perpendicular to the first direction, and the multiple scanning lines 112 and the multiple data lines 111 are insulated from each other and intersected. Furthermore, the base substrate 11 includes a substrate 113, a gate electrode 114, a functional layer 115, and a source-drain electrode 116.

The substrate 113 is disposed in parallel with and opposite to the color filter substrate 20, and the gate electrode 114, the functional layer 115, and the source-drain electrode 116 are sequentially stacked on the surface of the substrate 113 facing toward the surface 1131 of the color filter substrate 20. Wherein the multiple scanning lines 112 and the gate electrode 114 are located in the same layer, and the multiple data lines 111 and the source-drain electrode 116 are located in the same layer. In this embodiment, the second direction is a horizontal direction, and the multiple scanning lines 112 are disposed in parallel and at intervals in the horizontal direction, and the multiple data lines 111 are disposed in parallel and at intervals along a direction perpendicular to the horizontal direction (i.e., a vertical direction). The multiple scanning lines 112 and the multiple data lines 111 are insulated from each other to divide multiple pixel units arranged in an array, and the pixel electrodes 12 and the common electrode 14 disposed opposite to the pixel electrodes 12 are located in the same pixel unit.

Figure 3:
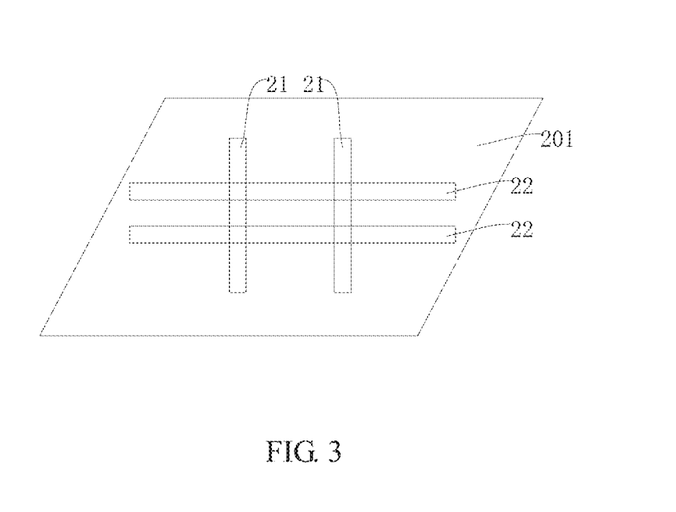
FIG. 3 is a schematic plan view of the structure of the touch receiving electrode and the first sub-black matrix on the first surface of the display panel.

Referring to FIG. 3, in a direction perpendicular to the base substrate 11, the first surface 201 is provided with multiple first sub-black matrixes 22 directly opposite to the scanning line 112. The first sub-black matrix 22 extends along the second direction on the first surface 201 and the first sub-black matrix 22 is intersected with the touch receiving electrode 21. Specifically, the shape of the first sub-black matrix 22 is similar to the shape of the scanning line 112, and is parallel and disposed at intervals along the horizontal direction on the first surface 201 to shield the light generated by deflecting liquid crystal molecules by the electric field between the pixel electrode 12 and the common electrode 14 on the top of the scanning line 112 to ensure a normal display of the image of the display panel 100. In general, the curved surface display of the display panel is performed in the horizontal direction, so that the first sub-black matrix 22 arranged in the horizontal direction is not severely deformed due to the curved surface display. In this embodiment, the area where the first sub-black matrix 22 overlaps with the touch receiving electrode 21 may be the first sub-black matrix 22 or the touch receiving electrode 21, which is not specifically limited in this embodiment.

The IPS-type display panel 100 of the present embodiment, through the way of forming the touch receiving electrode 21 and the first sub-black matrix 22 directly above the data line 111 in the color filter substrate 20 and directly above the scanning line 112, the present invention cannot only exclude the influence of the electric field between the pixel electrode 12 and the common electrode 14 on the liquid crystal molecules directly above the data line 111 and the scan line 112, but also ensure the normal display of the image, and the curved surface display performance of the IPS type display panel 100 is also improved.

Figure 4:
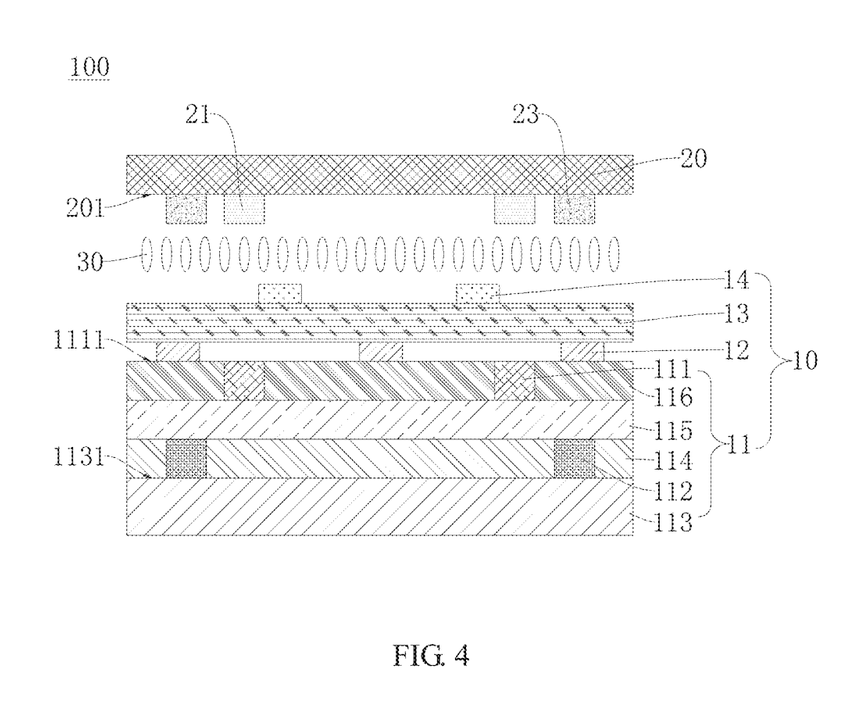
FIG. 4 is a schematic structural diagram of a second embodiment of the display panel of the present invention.
Figure 5:
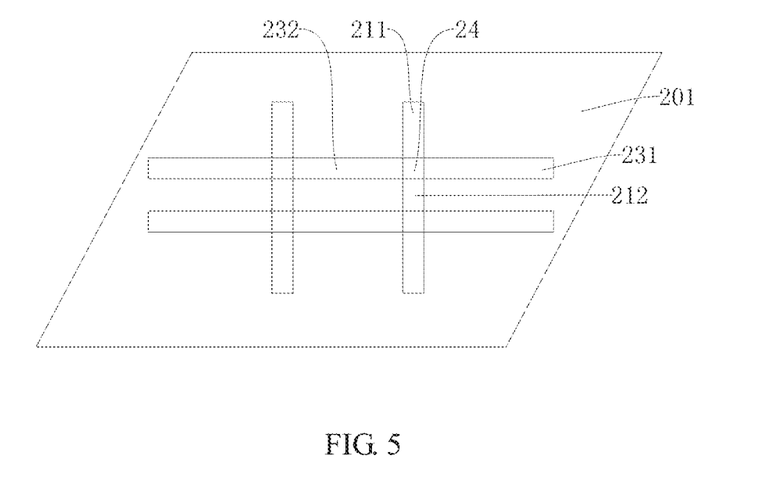
FIG. 5 is a schematic plan view of the structure of the touch receiving electrode and the touch transmitting electrode on the first surface of the display panel of FIG. 4.

Referring to FIG. 4 and FIG. 5, in a second embodiment of the IPS type display panel 100 of the present invention, the difference from the above embodiment is that, in a direction perpendicular to the base substrate 11, the first surface 201 is provided with multiple touch transmitting electrode 23 facing the scanning line 112, and the multiple touch transmitting electrodes 23 extend along the second direction on the first surface 201, the touch transmitting electrode 23 is intersected with the touch receiving electrode 21.

Specifically, the shape of the touch transmitting electrode 23 is similar to the shape of the scanning line 112, and is parallel and disposed at intervals along the horizontal direction on the first surface 201. The touch transmitting electrode 23 includes a first segment 231 and a second segment 232 disposed oppositely, the first segment 231 includes a first side 2311 facing the second segment 232, and the second segment 232 includes a second side 2321 opposite to the first side 2311; the touch receiving electrode 21 includes a third segment 211 and a fourth segment 212 disposed oppositely, and the third segment 211 includes a third side 2111 facing the fourth segment 212, and the fourth segment 212 includes a fourth side 2121 disposed opposite to the third side 2111; the first side 231, the second side 232, the third side 2111, and the fourth side 2121 are enclosed to form a closed hollow region 24.

A shielding electric field is formed between the pixel electrode 12 and the common electrode 14 after the electric signal is applied to the touch transmitting electrode 23, so that the liquid crystal located above the scanning line 112 is not deflected and arranged in a disorderly manner to ensure a normal display of a display image. Furthermore, the IPS type display panel 100 includes a signal processor, and the signal processor is configured to receive and process an electrical signal emitted by the touch transmitting electrode 23. In this embodiment, the touch transmitting electrode 23 is made of ITO, and there is no ITO in the closed hollow region 24. The closed hollow region 24 may be square, rectangular or circular, which is not specifically limited in this embodiment.

Specifically, the intersection point 24 of the touch transmitting electrode 23 arranged in the horizontal direction and the touch receiving electrode 21 arranged in the vertical direction is equivalent to form a capacitor. When the IPS type display panel 100 is squeezed, the size of the capacitor changes, the touch receiving electrode 21 receives an electrical signal generated by the change in capacitance, and the touch transmitting electrode 23 converts the electric signal and sent it to a signal processor. The signal processor receives the electrical signal and processes it to implement the touch function of the color filter substrate 20. In addition, when the touch transmitting electrode 23 and the touch receiving electrode 21 respectively input electrical signals, a shielding electric field is formed between the touch transmitting electrode 23 and the touch receiving electrode 21, which can shield the electric field in the external environment. The interference inside the IPS type display panel 100 is shielded, thereby protecting the IPS type display panel 100. The IPS type display panel 100 of the present embodiment completely replaces the BM with ITO, which further improves the bending performance of the IPS type display panel 100.

Figure 6:
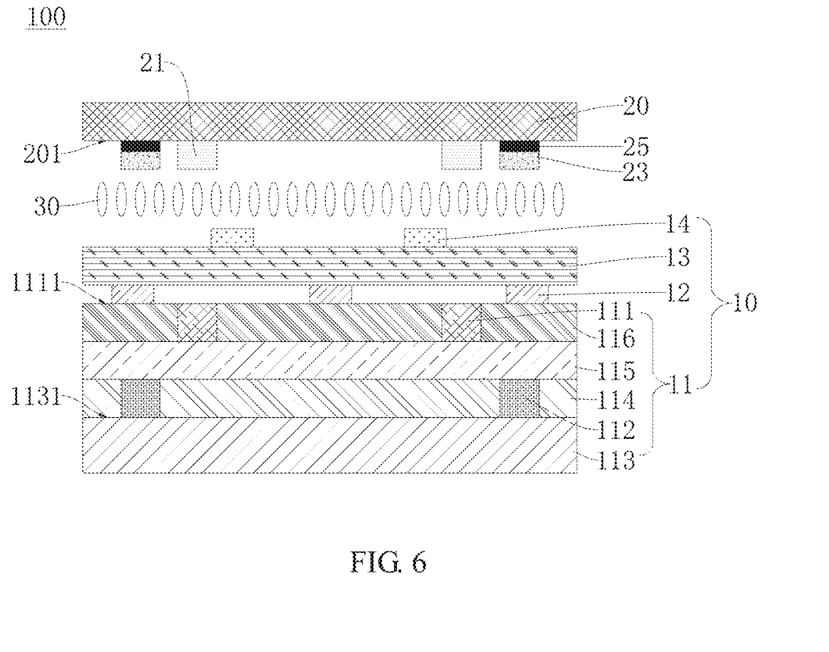
FIG. 6 is a schematic structural view of a third embodiment of the display panel of the present invention.

Referring to FIG. 6, in a third embodiment of the IPS type display panel 100 of the present invention, the difference from the second embodiment is that, in a direction perpendicular to the base substrate 11, the first surface 201 is provided with multiple second sub-black matrixes 25 directly opposite to the scanning line 112, and the second sub-black matrix 25 extends along the second direction on the first surface 201. The second sub-black matrix 25 is disposed to be intersected with the touch receiving electrode 21, and the touch transmitting electrode 23 is located at a surface of the second sub-black matrix 25 away from the color filter substrate 20. Specifically, the shape of the second sub-black matrix 25 is similar to the shape of the scanning line 112, and is parallel and disposed at intervals along the horizontal direction on the first surface 201.

The intersection point of the second sub-black matrix 25 and the touch receiving electrode 21 is the intersection point 24 of the touch transmitting electrode 23 and the touch receiving electrode 21, and the intersection point 24 is hollowed out. The intersection point 24 forms a capacitor to realize the touch function of the color filter substrate 20. In the IPS-type display panel 100 of the present embodiment, a second sub-black matrix 25 is added between the color filter substrate 20 and the touch transmitting electrode 23 to shield the liquid crystal molecules directly above the scanning line 112. The light transmitted by the electric field between the pixel electrode 12 and the common electrode 14 is deflected to further ensure a normal display of the image of the display panel 100.

Figure 7:
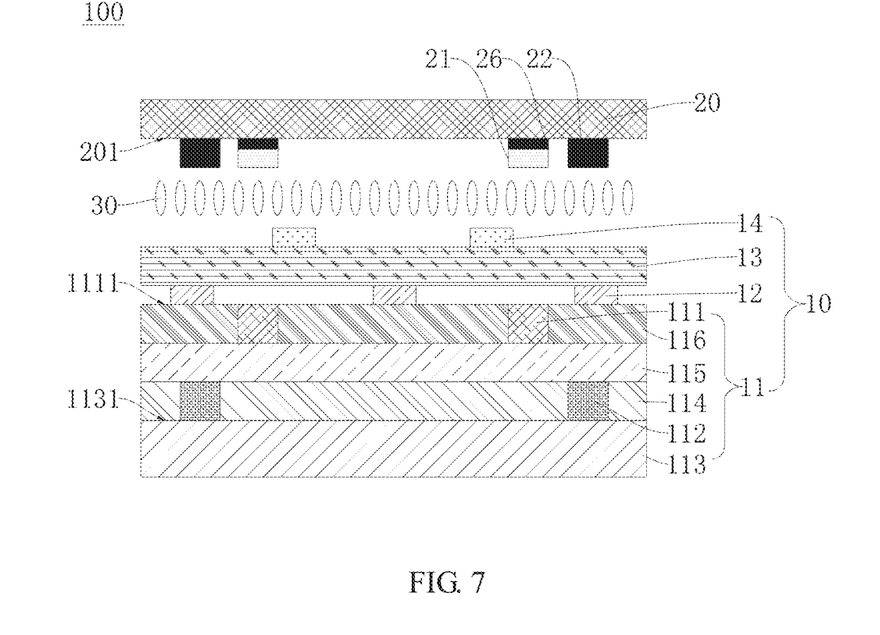
FIG. 7 is a schematic structural view of a fourth embodiment of the display panel of the present invention.

Referring to FIG. 7, in a fourth embodiment of the IPS type display panel 100 of the present invention, the difference from the above three embodiments is that, in a direction perpendicular to the base substrate 11, the first a surface 201 is provided with multiple third sub-black matrixes 26 directly opposite to the data line 111, and the multiple third sub-black matrixes 26 extend along the first direction on the first surface 201. The touch receiving electrode 21 is located on a surface of the third sub-black matrix 26 away from the color filter substrate 20.

In this embodiment, the third sub-black matrix 26 is intersected with the first sub-black matrix 22, and the intersection point of the third sub-black matrix 26 and the first sub-black matrix 22 is the intersection point of the touch receiving electrode 21 and the first sub-black matrix 22. Specifically, the third sub-black matrix 26 is similar in shape to the data line 111, and is disposed on the first surface 201 in parallel and disposed at intervals in the vertical direction. The IPS type display panel 100 of the present embodiment, through disposing the third sub-black matrix 26 between the color filter substrate 20 and the touch receiving electrode 21 to shield the light generated by the liquid crystal molecules deflecting by the electric field between the pixel electrode 12 and the common electrode 14 directly above the data line 111, and further ensure that a normal display of the image of the display panel 100.

Figure 8:
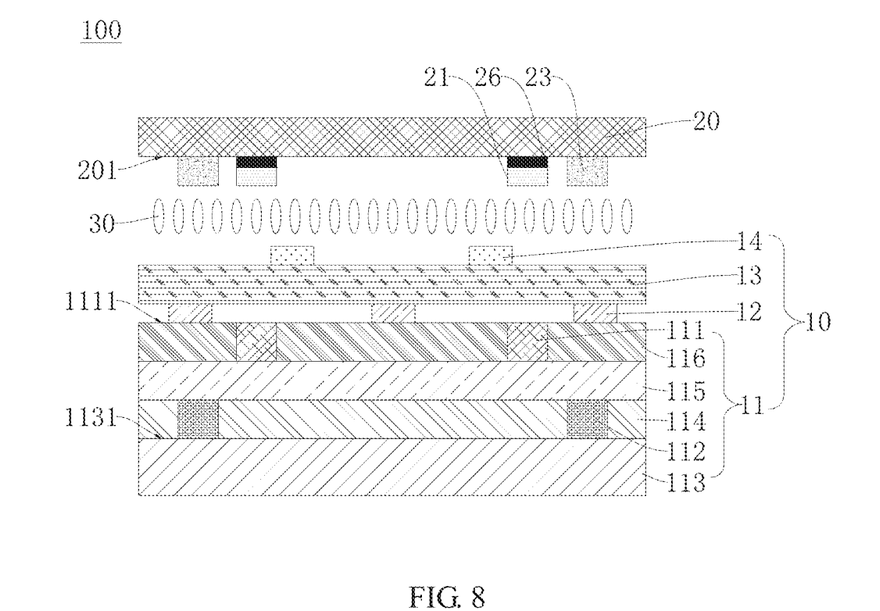
FIG. 8 is a schematic structural view of a fifth embodiment of the display panel of the present invention.

Referring to FIG. 8, in a fifth embodiment of the IPS display panel 100 of the present invention, the difference is that the third sub-black matrix 26 and the touch transmitting electrode 23 intersected. The intersection point of the third sub-black matrix 26 and the touch transmitting electrode 23 is the intersection point 24 of the touch receiving electrode 21 and the touch transmitting electrode 23, and the intersection point 24 is hollowed out to form a capacitor to implement the touch function of the color filter substrate 20.

The IPS type display panel 100 of the present embodiment, through designing the touch emitter electrode 23 corresponding to the scanning line 112 on the color filter substrate 20, the present invention cannot only shield the electric field between the pixel electrode 12 and the common electrode 14 to liquid crystal molecules above the scanning line 112, but also form a capacitor between the touch receiving electrode 21 and the touch function of the color filter substrate 20, and the touch transmitting electrode 23 and the touch receiving electrode 21 can further form a shielding electric field to shield the external electric field from interfering interior of the IPS type display panel 100.

Figure 9:
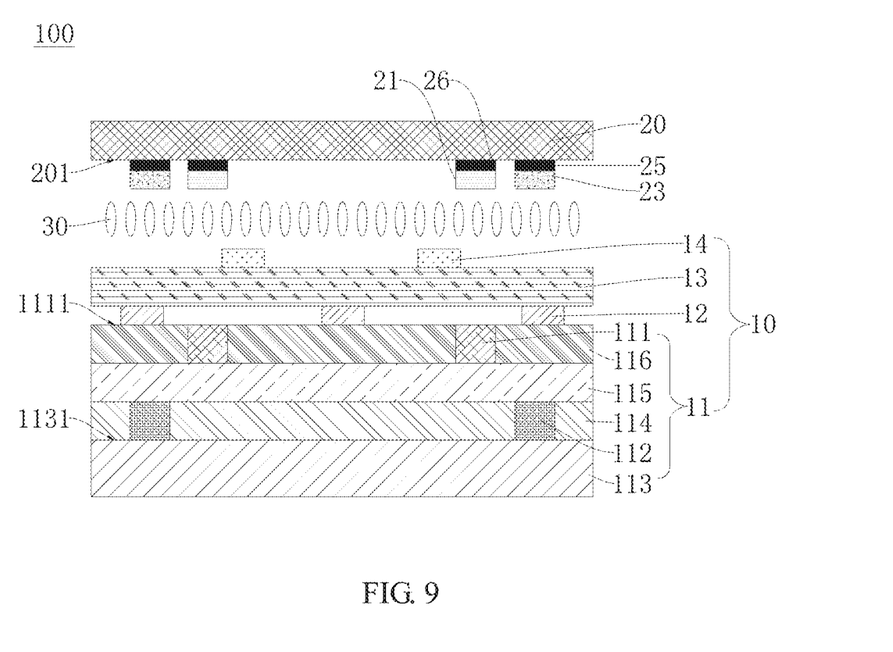
FIG. 9 is a schematic structural view of a sixth embodiment of the display panel of the present invention.

Referring to FIG. 9, in a sixth embodiment of the IPS type display panel 100 of the present invention, the difference is that the third sub-black matrix 26 and the second sub-black 25 are intersected. The intersection point of the third sub-black matrix 26 and the second sub-black matrix 25 is the intersection point 24 of the touch receiving electrode 21 and the touch transmitting electrode 23, and the intersection point 24 is hollowed out. The intersection point 24 is formed into a capacitor to realize the touch function of the color filter substrate 20. The IPS type display panel 100 of the present embodiment is provided with the second sub-black matrix 25 between the color filter substrate 20 and the touch transmitting electrode 23 to shield the light generated by the liquid crystal molecules deflected by the electric field between the 12 and the common electrode 14 directly above the scanning line 112 to further ensure that a normal display of the image of the display panel 100.

The above is only the preferred embodiment of the present invention, and it is of course not possible to limit the scope of the present invention. Those skilled in the art can understand that all or part of the process of implementing the above embodiments, and equivalent changes made according to the claims of the present invention, still fall within the scope covered by the invention.

What is claimed is:

1. An In-Plane Switching (IPS) type display panel, comprising:
    an array substrate and a color filter substrate which are disposed in parallel and oppositely; and
    a liquid crystal layer disposed between the array substrate and the color filter substrate;
    wherein the array substrate includes a base substrate, a pixel electrode, an insulation layer, and a common electrode, the base substrate includes multiple data lines deposed in parallel and at intervals, the base substrate is disposed in parallel with and opposite to the color filter substrate, the pixel electrode is located at a surface of the base substrate facing the color filter substrate, the insulation layer covers a surface of the pixel electrode away from the base substrate, the common electrode is located on a surface of the insulation layer away from the pixel electrode;
    wherein the color filter substrate includes a first surface facing the array substrate, and the first surface is provided with multiple touch receiving electrodes extending along a first direction and corresponding to the multiple data lines;
    wherein the multiple touch receiving electrodes are similar to the multiple data lines in shape and the multiple touch receiving electrodes are located directly above the multiple data lines; and
    wherein multiple touch transmitting electrodes are provided on the first surface of the color filter substrate and the multiple touch transmitting electrodes extend along the second direction on the first surface, the second direction being different from the first direction such that the multiple touch transmitting electrodes intersect the multiple touch receiving electrodes, wherein each one of the multiple touch transmitting electrodes includes a first segment and a second segment both extending in the first direction and spaced from each other in the first direction, the first segment having a first side facing the second segment, the second segment having a second side facing and spaced from the first side in the first direction; and each one of the multiple touch receiving electrodes includes a third segment and a fourth segment extending in the second direction and spaced from each other in the second direction, the third segment having a third side facing the fourth segment, the fourth segment includes a fourth side facing and spaced from the third side in the third side in the second direction, wherein said one of the multiple touch transmitting electrodes and said one of the multiple touch receiving electrodes intersect with each other and the intersection comprises a closed hollow region jointly defined by the first and second sides that are spaced from each other in the first direction by the hollow region and the third and fourth sides that are spaced from each other in the second direction by the hollow region.

2. The IPS type display panel according to claim 1, wherein the multiple data lines extend along the first direction on the base substrate, and the multiple touch receiving electrodes extend along the first direction on the first surface, and wherein in a direction perpendicular to the base substrate, each of the multiple touch receiving electrodes is directly opposite to one of the multiple data lines.

3. The IPS type display panel according to claim 2, wherein the base substrate includes multiple scanning lines which are disposed in parallel and at intervals, the multiple scanning lines extend along the second direction on the base substrate, wherein the second direction is perpendicular to the first direction, and the multiple scanning lines and the multiple data lines are insulated from each other and intersected.

4. The IPS type display panel according to claim 3, wherein in the direction perpendicular to the base substrate, the multiple touch transmitting electrodes are opposite to the multiple scanning lines, and the multiple touch transmitting electrodes extend along the second direction on the first surface.

5. The IPS type display panel according to claim 3, wherein in the direction perpendicular to the base substrate, the first surface is provided with multiple first sub-black matrixes directly opposite to the multiple scanning lines, the multiple first sub-black matrixes extend along the second direction on the first surface, and the multiple first sub-black matrixes intersect the multiple touch receiving electrodes.

6. The IPS type display panel according to claim 3, wherein in the direction perpendicular to the base substrate, the first surface is provided with multiple second sub-black matrixes directly opposite to the multiple scanning lines, and the multiple second sub-black matrixes extend along the second direction on the first surface, the multiple second sub-black matrixes intersect the multiple touch receiving electrodes, and the multiple touch transmitting electrodes are located on surfaces of the multiple second sub-black matrixes away from the color filter substrate.

7. The IPS type display panel according to claim 3, wherein in the direction perpendicular to the base substrate, the first surface is provided with multiple third sub-black matrixes directly opposite to the multiple data lines, and the multiple third sub-black matrixes extend along the first direction on the first surface, the multiple touch receiving electrodes are located on surfaces of the multiple third sub-black matrixes away from the color filter substrate.

8. The IPS type display panel according to claim 3, wherein in the direction perpendicular to the base substrate, the first surface is provided with multiple third sub-black matrixes directly opposite to the multiple data lines, and the multiple third sub-black matrixes extend along the first direction on the first surface, the multiple touch receiving electrodes are located on surfaces of the multiple third sub-black matrixes away from the color filter substrate.

9. The IPS type display panel according to claim 3, wherein the base substrate includes a substrate, a gate electrode, a functional layer and a source-drain electrode, the substrate is disposed in parallel with and opposite to the color filter substrate, and the gate electrode, the functional layer and the source-drain electrode are sequentially stacked on the surface of the substrate facing the surface of the color filter substrate, the multiple scanning lines and the gate electrode are located in the same layer, and the multiple data lines and the source-drain electrode are located in the same layer.

10. A display device, comprising a controller and an In-Plane Switching (IPS) type display panel, the controller is used for controlling the turning on and turning off of the IPS type display panel, and the IPS type display panel comprises:
an array substrate and a color filter substrate which are disposed in parallel and oppositely; and
a liquid crystal layer disposed between the array substrate and the color filter substrate;
wherein the array substrate includes a base substrate, a pixel electrode, an insulation layer, and a common electrode, the base substrate includes multiple data lines deposed in parallel and at intervals, the base substrate is disposed in parallel with and opposite to the color filter substrate, the pixel electrode is located at a surface of the base substrate facing the color filter substrate, the insulation layer covers a surface of the pixel electrode away from the base substrate, the common electrode is located on a surface of the insulation layer away from the pixel electrode;
wherein the color filter substrate includes a first surface facing the array substrate, and the first surface is provided with multiple touch receiving electrodes extending along a first direction and corresponding to the multiple data lines;
wherein the multiple touch receiving electrodes are similar to the multiple data lines in shape and the multiple touch receiving electrodes are located directly above the multiple data lines; and
wherein multiple touch transmitting electrodes are provided on the first surface of the color filter substrate and the multiple touch transmitting electrodes extend along the second direction on the first surface, the second direction being different from the first direction such that the multiple touch transmitting electrodes intersect the multiple touch receiving electrodes, wherein each one of the multiple touch transmitting electrodes includes a first segment and a second segment both extending in the first direction and spaced from each other in the first direction, the first segment having a first side facing the second segment, the second segment having a second side facing and spaced from the first side in the first direction; and each one of the multiple touch receiving electrodes includes a third segment and a fourth segment extending in the second direction and spaced from each other in the second direction, the third segment having a third side facing the fourth segment, the fourth segment includes a fourth side facing and spaced from the third side in the third side in the second direction, wherein said one of the multiple touch transmitting electrodes and said one of the multiple touch receiving electrodes intersect with each other and the intersection comprises a closed hollow region jointly defined by the first and second sides that are spaced from each other in the first direction by the hollow region and the third and fourth sides that are spaced from each other in the second direction by the hollow region.

11. The display device according to claim 10, wherein the multiple data lines extend along the first direction on the base substrate, and the multiple touch receiving electrodes extend along the first direction on the first surface, and wherein in a direction perpendicular to the base substrate, each of the multiple touch receiving electrodes is directly opposite to one of the multiple data lines.

12. The display device according to claim 11, wherein the base substrate includes multiple scanning lines which are disposed in parallel and at intervals, the multiple scanning lines extend along the second direction on the base substrate, wherein the second direction is perpendicular to the first direction, and the multiple scanning lines and the multiple data lines are insulated from each other and intersected.

13. The display device according to claim 12, wherein in the direction perpendicular to the base substrate, the multiple touch transmitting electrodes are opposite to the multiple scanning lines, and the multiple touch transmitting electrodes extend along the second direction on the first surface.

14. The display device according to claim 12, wherein in the direction perpendicular to the base substrate, the first surface is provided with multiple first sub-black matrixes directly opposite to the multiple scanning lines, the multiple first sub-black matrixes extend along the second direction on the first surface, and the multiple first sub-black matrixes intersect the multiple touch receiving electrodes.

15. The display device according to claim 12, wherein in the direction perpendicular to the base substrate, the first surface is provided with multiple second sub-black matrixes directly opposite to the multiple scanning lines, and the multiple second sub-black matrixes extend along the second direction on the first surface, the multiple second sub-black matrixes intersect the multiple touch receiving electrodes, and the multiple touch transmitting electrodes are located on surfaces of the multiple second sub-black matrixes away from the color filter substrate.

16. The display device according to claim 12, wherein in the direction perpendicular to the base substrate, the first surface is provided with multiple third sub-black matrixes directly opposite to the multiple data lines, and the multiple third sub-black matrixes extend along the first direction on the first surface, the multiple touch receiving electrodes are located on surfaces of the multiple third sub-black matrixes away from the color filter substrate.

17. The display device according to claim 12, wherein the base substrate includes a substrate, a gate electrode, a functional layer and a source-drain electrode, the substrate is disposed in parallel with and opposite to the color filter substrate, and the gate electrode, the functional layer and the source-drain electrode are sequentially stacked on the surface of the substrate facing the surface of the color filter substrate, the multiple scanning lines and the gate electrode are located in the same layer, and the multiple data lines and the source-drain electrode are located in the same layer.

* * * * *